United States Patent
Vasconcellos et al.

(10) Patent No.: US 7,291,273 B2
(45) Date of Patent: Nov. 6, 2007

(54) METHODS FOR REMOVING METALS FROM PLATING OPERATION

(75) Inventors: Stephen R. Vasconcellos, Doylestown, PA (US); Nicholas R. Blandford, Willow Grove, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/301,073

(22) Filed: Dec. 12, 2005

(65) Prior Publication Data

US 2007/0131620 A1   Jun. 14, 2007

(51) Int. Cl.
*B01D 24/00* (2006.01)
(52) U.S. Cl. ................................ 210/683; 210/688
(58) Field of Classification Search ............. 210/683, 210/688
See application file for complete search history.

(56) References Cited

U.S. PATENT DOCUMENTS

| | | | |
|---|---|---|---|
| 4,552,700 A | 11/1985 | Panster et al. | |
| 5,281,631 A | 1/1994 | Horwitz et al. | |
| 5,354,831 A | 10/1994 | Panster et al. | |
| 6,211,408 B1 * | 4/2001 | Hilton | 562/608 |
| 2004/0077889 A1 | 4/2004 | Sullivan et al. | |

OTHER PUBLICATIONS

Szymanowski, Paul, "Electroless Plating," Micro Plating, Inc., www.corrosion-doctors.org/MetalCoating/Electroless.htm—Internet printout, Nov. 21, 2005, 5 pages.

* cited by examiner

*Primary Examiner*—Chester T. Barry
(74) *Attorney, Agent, or Firm*—Duane Morris LLP

(57) ABSTRACT

The present invention relates to compounds and methods for removing metals, e.g., ionic cobalt from an electroless plating operation, preferably to levels less than 5 ppm. The metals can then be either landfilled or regenerated for electrowinning and reuse. The invention utilizes an ion exchange media comprised of a silica backbone and functionalized with phosphonate groups.

10 Claims, No Drawings

METHODS FOR REMOVING METALS FROM PLATING OPERATION

FIELD OF THE INVENTION

The present invention relates to methods for removing metals, e.g., ionic cobalt from an electroless plating operation, preferably to levels less than 5 ppm. The metals can then be either landfilled or regenerated for electrowinning and reuse.

BACKGROUND OF THE INVENTION

Acid catalysts are utilized in the chemical and biochemical industries to conduct a wide range of chemical transformations. A range of homogenous and heterogeneous catalysts are used, some of which require high temperatures to be effective and produce considerable amounts of bi-products and waste. These unwanted products and waste have to be treated and destroyed. The drive for more environmentally friendly processes—"Green Chemistry"—highlights the need for reusable, more effective and selective catalysts. This need has led to investigations into the design of new materials which can catalyze a variety of chemical transformations. Key requirements for such new catalysts are very good thermal stability, high insensitivity to chemical attack, high functional group loading, fixed and rigid structures, optimum functional groups so as to avoid rearrangements and side products, limited swelling capability, insolubility in organic solvents, ease of purification and high reusability, high ageing resistance and ease of access to the functional group which conducts the chemical transformation. In addition, the processes to make such catalyst systems have to be flexible so as to enable the production of optimum structures and shapes for specific reactions. This could include tailoring the porosity from anywhere between macroporous to microporous structures, variable loading of the functional group, ease of making different metal derivatives and selective pH ranges.

A range of metals and catalysts have been embedded within or adsorbed onto the surface of silica, and other materials. One of the problems encountered with these systems is the loss of the active functional groups due to their often weak attachment to the silica. New organo-silica materials are needed which while possessing the properties described above, have functional groups which are strongly attached and which bind strongly to a range of metals and catalysts. As a consequence of stricter environmental regulations, there is a growing requirement for more effective systems for the removal and recovery of metals from a wide spectrum of metal contaminated solvents and aqueous-based wastes, and from contaminated waters. For example, industries such as the nuclear industry and the electroplating industry generate substantial quantities of water-based effluent, which are heavily contaminated with undesirable metal ions. Cation exchangers have been used to remove metal ions from solution. The type of cation exchangers which are employed are primarily of an organic, partly cross-linked polystyrene backbone with sulfonate groups attached to some of the phenyl rings. The physical and chemical properties of these polystyrene sulfonic cation exchangers are strongly affected by the organic nature of the polymeric backbone, so that a number of disadvantages affect their technical field of application. These limitations include relatively low temperature resistance (100-130° C.), sensitivity to chemical attack which can result in complete breakdown of the polymer matrix, strong swelling capacity, non-usability in certain organic solvents and the need for swelling to make the functional groups accessible. Organophosphonic acid cation exchangers have also been reported in e.g., U.S. Pat. No. 5,281,631. These systems are based on the products from the copolymerization of vinylidene disphosphonic acid with styrene, acrylonitrile and divinylbenzene. However, the physical and chemical properties of these organophosphonic acid resins are very similar to the polystyrene sulfonic acid based systems, and thus their field of application is limited.

Inorganic polymer systems such as silica, aluminum oxide and titanium oxide, which do not suffer some of these drawbacks, have been investigated as ion exchangers. Active functional groups or metals are attached by a variety of means to these systems. However, these systems suffer from the fact that only a low level of functional groups can be bound onto these surfaces. One of the additional problems encountered with these systems is that the functional groups can be removed on use or on standing. This is due to the rather weak attachment between the functional group and the surface atoms on the support. Strong acidic cation exchangers based on sulfonic acid groups attached to an organopolysiloxane backbone have been described in U.S. Pat. Nos. 4,552,700 and 5,354,831. The materials reported have a general formula of $(O_{3/2}Si\text{—}R^1\text{—}SO_3)_xM_x$, where $R^1$ is an alkyl or cycloalkyl fragment, M is hydrogen or a mono to tetravalent metal ion, and where the free valences of the oxygen atoms are saturated by silicon atoms of other groups of this formula and/or by cross-linking bridge members such as $SiO_{4/2}$, $R^1SiO_{3/2}$, $TiO_{4/2}$, $AlO_{3/2}$, etc. While these materials can act as cation exchangers, it is generally recognized that sulfonic acid groups are limited in their effectiveness to complex with a range of metals and in comparison to other functional groups. In addition, the sulfonate group is also limited by the fact that it is a mono anion, and thus more of these functional groups are needed to bind to metals compared to other functional groups.

SUMMARY OF THE INVENTION

The present invention relates to methods for removing metals, e.g., ionic cobalt from an electroless plating operation, preferably to levels less than 5 ppm. The metal can then be either landfilled or regenerated for electrowinning (reclamation) and reuse. The invention utilizes an ion exchange media comprised of a silica backbone and functionalized with phosphonate groups.

DETAILED DESCRIPTION OF THE INVENTION

The compound to be used in accordance with the present invention is as follows:

Formula 1:

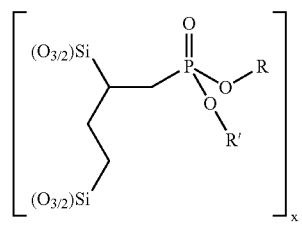

-continued

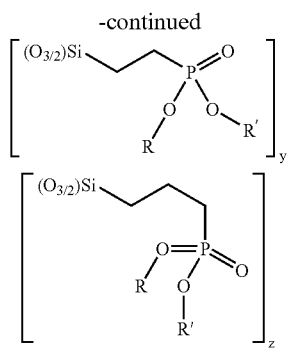

wherein R and $R^1$ are each independently hydrogen, a linear or branched $C_{1-40}$ alkyl, $C_{2-40}$ alkenyl or $C_{2-40}$ alkynyl group, an aryl or $C_{1-40}$ alkylaryl group or an optionally complex metal ion $M^{n+}/n$ wherein n is an integer from 1 to 8; the free valences of the silicate oxygen atoms are saturated by one or more of: silicon atoms of other groups of Formula 1, hydrogen, a linear or branched $C_{1-12}$ alkyl group or by cross-linking bridge members $R^3_q M^1(OR^2)_m O_{k/2}$ or $Al(OR^2)_{3-p} O_{p/2}$ or $R^3 Al(OR^2)_{2-r} O_{r/2}$; where $M^1$ is Si or Ti; $R^2$ is a linear or branched $C_{1-12}$ alkyl group; and $R^3$ is a linear or branched $C_{1-6}$ alkyl group; k is an integer from 1 to 4 and q and m are integers from 0 to 2; such that m+k+q=4; and p is an integer from 1 to 3; and r is an integer from 1 to 2; or other known oxo metal bridging systems; x, y and z are integers such that the ratio of x:y+z, varies from 0.00001 to 100,000 with the fragments $[O_{3/2}SiCH(CH_2PO(OR)(OR^1))CH_2CH_2SiO_{3/2}]_x$ and $[O_{3/2}SiCH_2CH_2PO(OR)(OR^1)]_y$ always present while the integer z varies from 0 to 200y. Formula 1 can be abbreviated to $X_x Y_y Z_z$ where X represents $[O_{3/2}SiCH(CH_2PO(OR)(OR^1))CH_2CH_2SiO_{3/2}]$, Y represents $[O_{3/2}SiCH_2CH_2PO(OR)(OR^1)]$ and Z represents $[O_{3/2}SiCH_2CH_2CH_2PO(OR)(OR^1)]$.

Further details concerning the compounds utilized in accordance with the present invention, their production and uses are found in Pub. No. U.S. 2004/0077889, herein incorporated by reference.

The efficiency of above compounds utilized in accordance with the present invention can range from about 0.5-5 mmole/g. As shown in Table I below, the media is capable of reducing cobalt to well below detection limits.

TABLE I

| Metal Ion Type | Initial Metal Ion Concentration (ppm) | Metal Ion Concentration After Contact w/Media (ppm) |
|---|---|---|
| $Cr^{+3}$ | 100 | 0 |
| $Mn^{+2}$ | 100 | 0.05 |
| $Fe^{+3}$ | 100 | 0.16 |
| $Co^{+2}$ | 100 | 0 |
| $Ni^{+2}$ | 100 | 0.12 |
| $Pb^{+2}$ | 100 | 0.08 |
| $Cu^{+2}$ | 100 | 0.08 |
| $Zn^{+2}$ | 100 | 0.07 |
| $Cd^{+2}$ | 100 | 0.06 |

The particle size of the above compound utilized in the present invention ranges preferably from about 5-500 um, with a range of from about 20-100 um particularly preferred. The materials may also be used in conjunction with a nanofilter in order to concentrate the metal, followed by passing the concentrate through the modified silica in order to remove the cobalt. A pH range of treatment of from about 6-10 is preferred, with a pH of from about 7.5-9 particularly preferred. The modified silica material is commercially available from Phosphonics Ltd. The processes of the present invention find particular usefulness in microelectronics industry applications.

While the present invention has been described with respect to particular embodiments thereof, it is apparent that numerous other forms and modifications of the invention will be obvious to those skilled in the art. The appended claims and the present invention generally should be construed to cover all such obvious forms and modifications which are within the true spirit and scope of the present invention.

What is claimed is:

1. A method of removing metals from an electroless plating operation, comprising adding to said operation a composition including a compound of Formula 1:

Formula 1

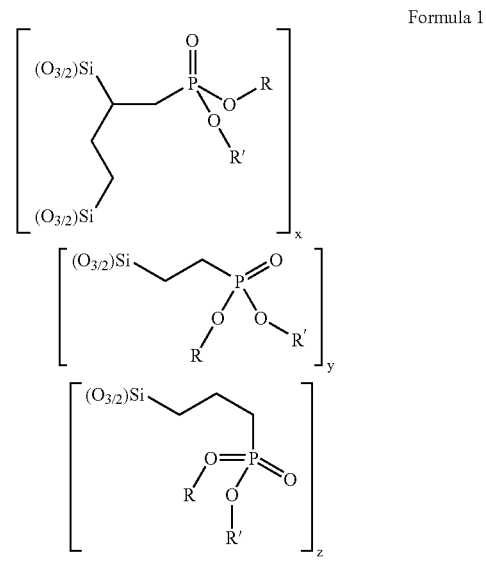

wherein R and $R^1$ are each independently hydrogen, a linear or branched $C_{1-40}$ alkyl, $C_{2-40}$ alkenyl or $C_{2-40}$ alkynyl group, an aryl or $C_{1-40}$ alkylaryl group or optionally a complex metal ion $M^{n+}/n$ wherein n is an integer from 1 to 8; the free valences of the silicate oxygen atoms are saturated by one or more of: silicon atoms of other groups of Formula 1, hydrogen, a linear or branched $C_{1-12}$ alkyl group or by cross-linking bridge members $R^3_q M^1(OR^2)_m O_{k/2}$ or $Al(OR^2)_{3-p} O_{p/2}$ or $R^3 Al(OR^2)_{2-r} O_{r/2}$; where $M^1$ is Si or Ti; $R^2$ is a linear or branched $C_{1-12}$ alkyl group; and $R^3$ is a linear or branched $C_{1-6}$ alkyl group; k is an integer from 1 to 4 and q and m are integers from 0 to 2; such that m+k+q=4; and p is an integer from 1 to 3; and r is an integer from 1 to 2; or other oxo metal bridging systems; x, y and z are integers such that the ratio of x:y+z, varies from 0.00001 to 100,000 with the fragments $[O_{3/2}SiCH(CH_2PO(OR)(OR^1))CH_2CH_2SiO_{3/2}]_x$ and $[O_{3/2}SiCH_2CH_2PO(OR)(OR^1)]_y$ always present while the integer z varies from 0 to 200y.

2. The method as recited in claim 1, wherein the amount of compound is from about 0.5-5 mmole/g.

3. The method as recited in claim 1, wherein the metals are removed from the electroless plating operation to levels less than 5 ppm.

4. The method as recited in claim 1, wherein said metals include cobalt.

5. The method as recited in claim 4, wherein the cobalt can be regenerated for reclamation.

6. The method as recited in claim 1, wherein the particle size of the compound utilized is from 5-500 um.

7. The method as recited in claim 6, wherein the particle size of the compound utilized is from 20-100 um.

8. The method as recited in claim 1, wherein the compound is used in conjunction with a nanofilter.

9. The method as recited in claim 1, wherein the pH of treatment is from 6-10.

10. The method as recited in claim 9, wherein the pH of treatment is ftom 7.5-9.

* * * * *